(12) United States Patent
Edlund et al.

(10) Patent No.: US 7,297,183 B2
(45) Date of Patent: Nov. 20, 2007

(54) HYDROGEN PURIFICATION DEVICES, COMPONENTS, AND FUEL PROCESSING SYSTEMS CONTAINING THE SAME

(75) Inventors: David J. Edlund, Bend, OR (US); Chester B. Frost, Bend, OR (US); R. Todd Studebaker, Bend, OR (US)

(73) Assignee: IdaTech, LLC, Bend, OR (US)

( * ) Notice: Subject to any disclaimer, the term of this patent is extended or adjusted under 35 U.S.C. 154(b) by 414 days.

(21) Appl. No.: 10/945,783

(22) Filed: Sep. 20, 2004

(65) Prior Publication Data
US 2006/0060084 A1 Mar. 23, 2006

(51) Int. Cl.
B01D 53/22 (2006.01)
(52) U.S. Cl. .................................. 96/4; 95/55
(58) Field of Classification Search ............... 96/4, 96/43, 53; 95/43, 55
See application file for complete search history.

(56) References Cited

U.S. PATENT DOCUMENTS

| | | | |
|---|---|---|---|
| 2,824,620 | A | 2/1958 | De Rosset |
| 3,208,198 | A | 9/1965 | Rubin |
| 3,336,730 | A | 8/1967 | McBride et al. |
| 3,338,681 | A | 8/1967 | Kordesch |
| 3,344,586 | A | 10/1967 | Langley et al. |
| 3,350,176 | A | 10/1967 | Green et al. |
| 3,428,476 | A | 2/1969 | Langley et al. |
| 3,447,288 | A | 6/1969 | Juda et al. |
| 3,469,944 | A | 9/1969 | Bocard et al. |
| 3,486,301 | A | 12/1969 | Bonnet |
| 3,520,803 | A | 7/1970 | Iaconelli |
| 3,534,531 | A | 10/1970 | Eguchi et al. |
| 3,564,819 | A | 2/1971 | Neulander et al. |
| 3,837,146 | A | 9/1974 | Faure et al. |
| 3,881,897 | A | 5/1975 | Faure et al. |
| 4,078,985 | A | 3/1978 | Takeuchi |

(Continued)

FOREIGN PATENT DOCUMENTS

CA 1238866 7/1988

(Continued)

OTHER PUBLICATIONS

English language abstract of Japanese Patent No. 6345408, 1994.

(Continued)

Primary Examiner—Robert A. Hopkins
(74) Attorney, Agent, or Firm—Kolisch Hartwell, P.C.

(57) ABSTRACT

Hydrogen purification devices, components thereof, and fuel processors and fuel cell systems containing the same. The hydrogen purification devices include an enclosure, such as a pressure vessel, that contains a separation assembly adapted to receive under pressure a mixed gas stream containing hydrogen gas and to produce a stream that contains pure or at least substantially pure hydrogen gas therefrom. In some embodiments, the enclosure is sealed without gaskets. The separation assembly includes at least one hydrogen-permeable and/or hydrogen-selective membrane, and in some embodiments the hydrogen-selective membrane is permanently and directly secured to the enclosure. In some embodiments, the membrane is welded, diffusion bonded or brazed directly to the enclosure. In some embodiments a portion of the hydrogen-selective membrane forms a portion of the sealed enclosure, and, in some embodiments, an interface is formed from consumed portions of the hydrogen-selective membrane and the enclosure.

57 Claims, 4 Drawing Sheets

U.S. PATENT DOCUMENTS

| | | | |
|---|---|---|---|
| 4,098,959 A | 7/1978 | Fanciullo | |
| 4,098,960 A | 7/1978 | Gagnon | |
| 4,175,165 A | 11/1979 | Adlhart | |
| 4,214,969 A | 7/1980 | Lawrance | |
| 4,243,536 A | 1/1981 | Prölss | |
| 4,254,086 A | 3/1981 | Sanders | |
| 4,468,235 A | 8/1984 | Hill | |
| 4,472,176 A | 9/1984 | Rubin | |
| 4,613,436 A | 9/1986 | Wight et al. | |
| 4,999,107 A | 3/1991 | Guerif | |
| 5,126,045 A | 6/1992 | Kohlheb et al. | |
| 5,139,541 A | 8/1992 | Edlund | |
| 5,158,581 A | 10/1992 | Coplan | |
| 5,210,059 A | 5/1993 | Matturo et al. | |
| 5,225,080 A | 7/1993 | Karbachsch et al. | |
| 5,354,547 A | 10/1994 | Rao et al. | |
| 5,401,589 A | 3/1995 | Palmer et al. | |
| 5,432,710 A | 7/1995 | Ishimaru et al. | |
| 5,449,848 A | 9/1995 | Itoh | |
| 5,468,283 A * | 11/1995 | French et al. | 95/45 |
| 5,498,278 A | 3/1996 | Edlund | |
| 5,500,122 A | 3/1996 | Schwartz | |
| 5,520,807 A | 5/1996 | Myrna et al. | |
| 5,536,405 A | 7/1996 | Myrna et al. | |
| 5,614,001 A | 3/1997 | Kosaka et al. | |
| 5,634,354 A * | 6/1997 | Howard et al. | 62/624 |
| 5,637,414 A | 6/1997 | Inoue et al. | |
| 5,645,626 A | 7/1997 | Edlund et al. | |
| 5,734,092 A | 3/1998 | Wang et al. | |
| 5,759,712 A | 6/1998 | Hockaday | |
| 5,782,960 A | 7/1998 | Ogawa et al. | |
| 5,858,314 A | 1/1999 | Hsu et al. | |
| 5,861,137 A | 1/1999 | Edlund | |
| 5,888,273 A | 3/1999 | Buxbaum | |
| 5,891,222 A | 4/1999 | Hilgendorff et al. | |
| 5,904,754 A | 5/1999 | Juda et al. | |
| 5,931,987 A | 8/1999 | Buxbaum | |
| 5,980,989 A | 11/1999 | Takahashi et al. | |
| 5,997,594 A | 12/1999 | Edlund et al. | |
| 6,083,637 A | 7/2000 | Walz et al. | |
| 6,152,995 A | 11/2000 | Edlund | |
| 6,168,650 B1 | 1/2001 | Buxbaum | |
| 6,171,574 B1 | 1/2001 | Juda et al. | |
| 6,183,543 B1 | 2/2001 | Buxbaum | |
| 6,221,117 B1 | 4/2001 | Edlund et al. | |
| 6,231,831 B1 | 5/2001 | Autenrieth et al. | |
| 6,319,306 B1 | 11/2001 | Edlund et al. | |
| 6,332,913 B1 | 12/2001 | Breitschwerdt et al. | |
| 6,350,297 B1 | 2/2002 | Doyle et al. | |
| 6,379,524 B1 | 4/2002 | Lee et al. | |
| 6,383,670 B1 | 5/2002 | Edlund et al. | |
| 6,419,726 B1 | 7/2002 | Frost et al. | |
| 6,458,189 B1 | 10/2002 | Edlund et al. | |
| 6,461,408 B2 | 10/2002 | Buxbaum | |
| 6,494,937 B1 | 12/2002 | Edlund et al. | |
| 6,537,352 B2 | 3/2003 | Edlund et al. | |
| 6,562,111 B2 | 5/2003 | Edlund et al. | |
| 6,569,227 B2 | 5/2003 | Edlund et al. | |
| 6,596,057 B2 | 7/2003 | Edlund et al. | |
| 6,602,325 B1 | 8/2003 | Frost et al. | |
| 6,632,270 B2 | 10/2003 | Edlund et al. | |
| 6,660,069 B2 | 12/2003 | Sato et al. | |
| 6,719,831 B2 | 4/2004 | Edlund et al. | |
| 6,719,832 B2 | 4/2004 | Studebaker et al. | |
| 6,723,156 B2 | 4/2004 | Edlund et al. | |
| 6,767,389 B2 | 7/2004 | Edlund et al. | |
| 6,783,741 B2 | 8/2004 | Edlund et al. | |
| 6,835,232 B2 | 12/2004 | Frost et al. | |
| 2004/0003720 A1 | 1/2004 | Beisswenger et al. | |
| 2004/0083890 A1 | 5/2004 | Edlund et al. | |

FOREIGN PATENT DOCUMENTS

| | | |
|---|---|---|
| JP | 10-263372 | 10/1998 |
| WO | WO 99/30806 | 6/1999 |
| WO | WO 01/64321 | 9/2001 |

OTHER PUBLICATIONS

English language abstract of Japanese Patent No. 10-263372, 1998.

English language abstract of German language PCT Patent Application Serial No. WO 01/64321, 2001.

Edlund, David J. and William A. Pledger, "The Practical Use of Metal-Membrane Reactors for Industrial Applications," The 1995 Membrane Technology Reviews, pp. 89-97 (Nov. 1994).

Shu, J., et al., "Catalytic Palladium-Based Membrane Reactors: A Review," The Canadian Journal of Chemical Engineering, vol. 69, pp. 1036-1060 (Oct. 1991).

US 6,340,380, 01/2002, Frost et al. (withdrawn)

* cited by examiner

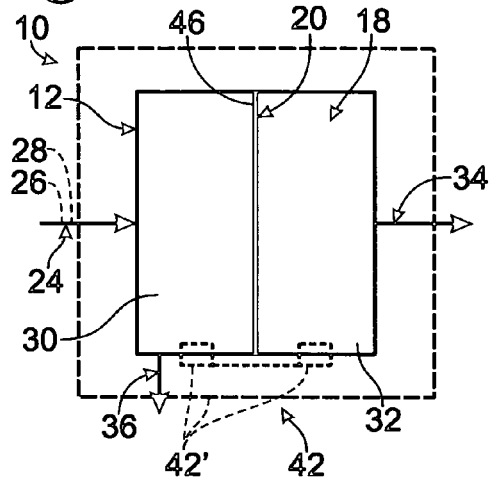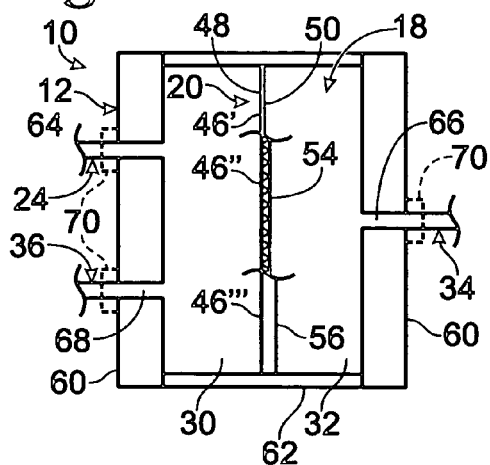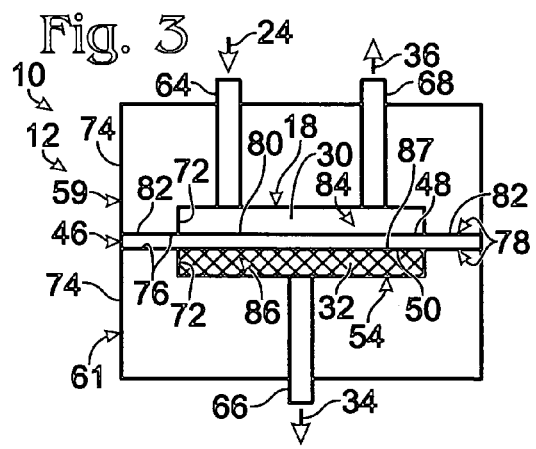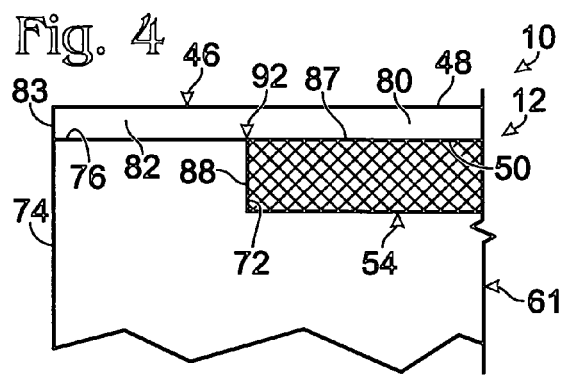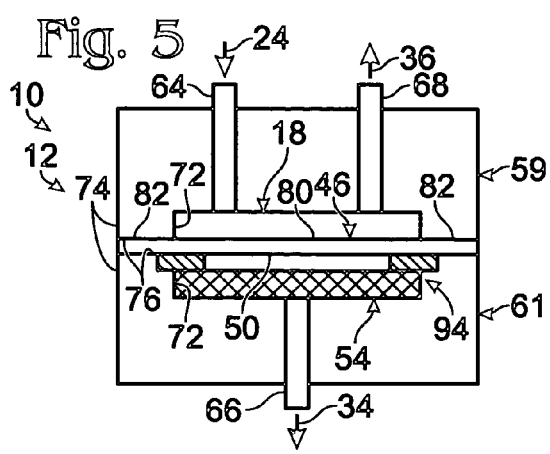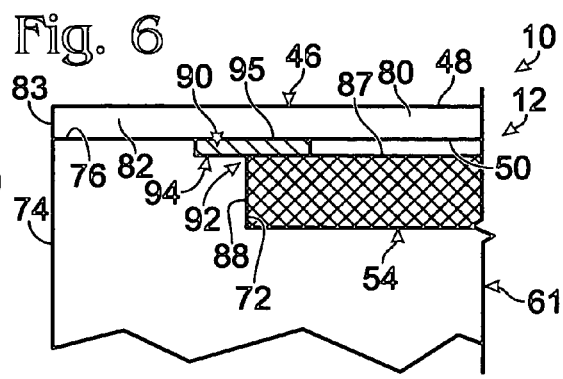

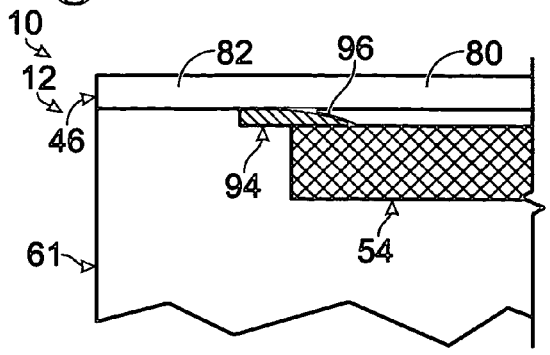
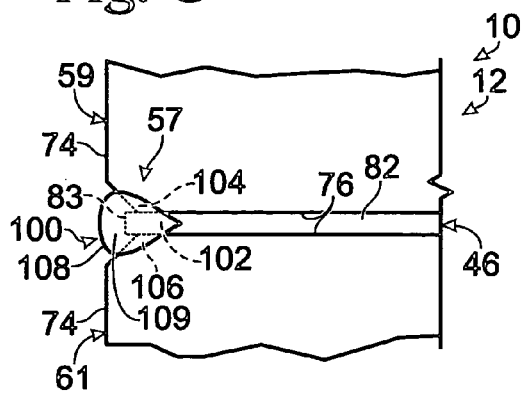
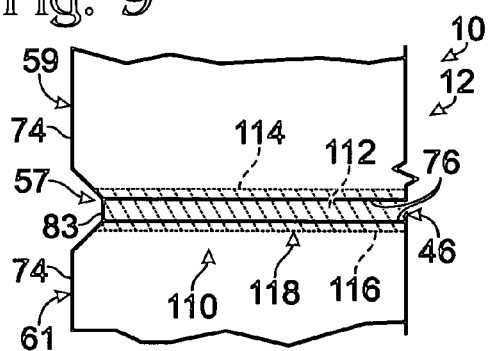
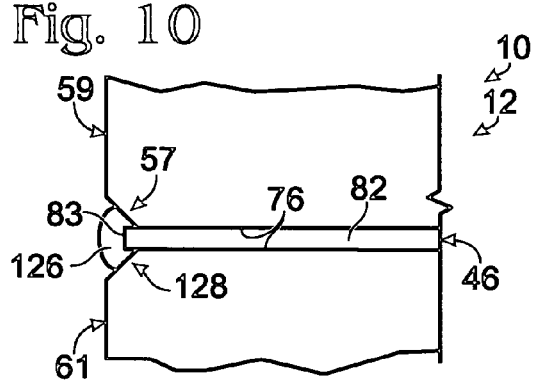
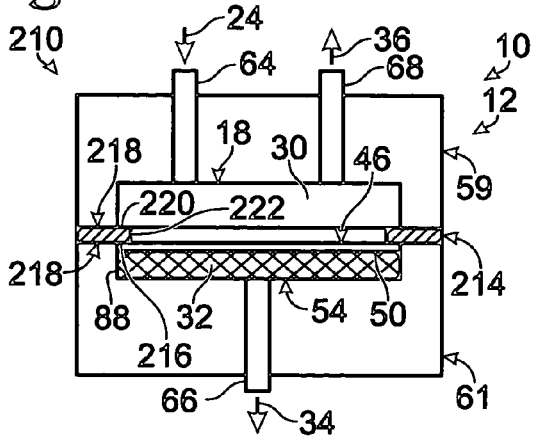
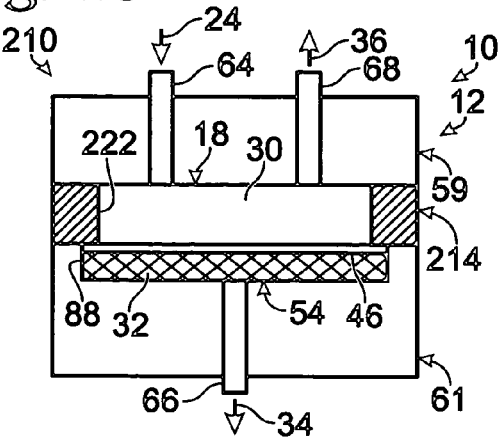

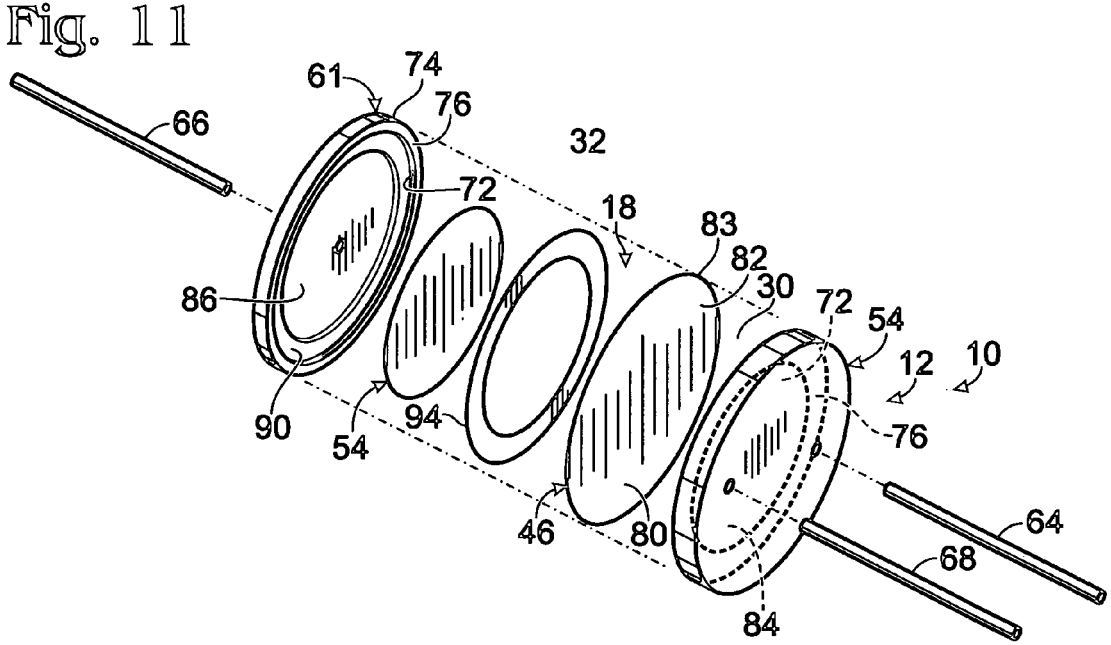
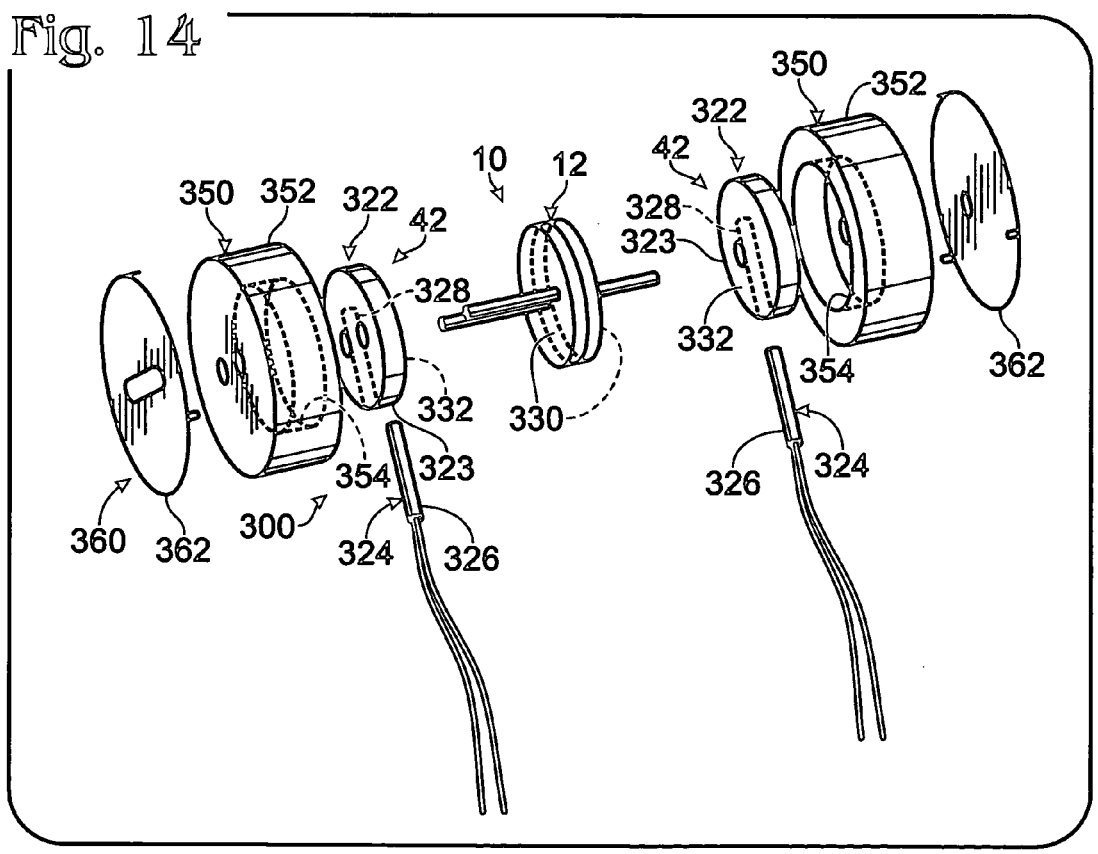

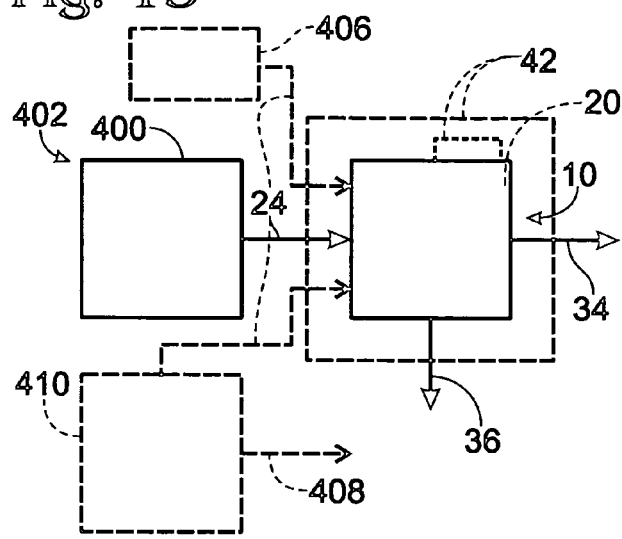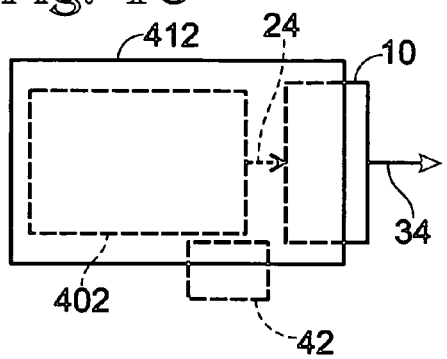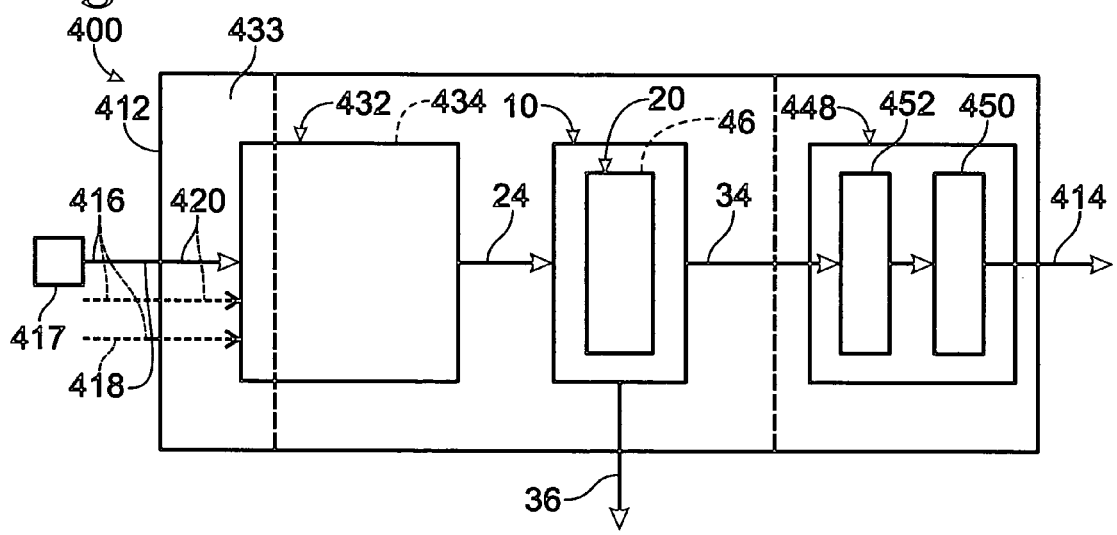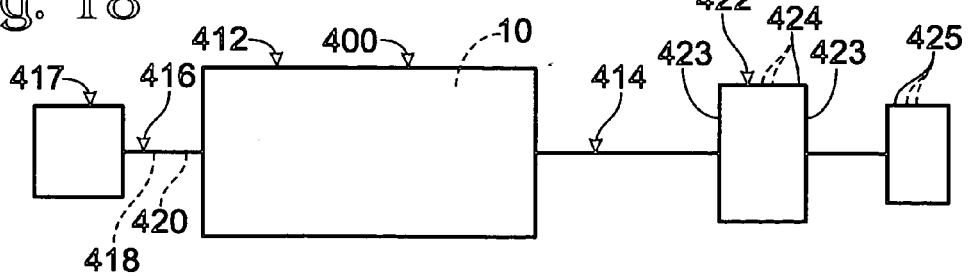

US 7,297,183 B2

HYDROGEN PURIFICATION DEVICES, COMPONENTS, AND FUEL PROCESSING SYSTEMS CONTAINING THE SAME

FIELD OF THE DISCLOSURE

The present disclosure is generally related to the purification of hydrogen gas, and more specifically to hydrogen purification devices, components, and fuel processing and fuel cell systems containing the same.

BACKGROUND OF THE DISCLOSURE

Purified hydrogen is used in the manufacture of many products including metals, edible fats and oils, and semiconductors and microelectronics. Purified hydrogen also is an important fuel source for many energy conversion devices. For example, fuel cells use purified hydrogen and an oxidant to produce an electrical potential. Various processes and devices may be used to produce the hydrogen gas that is consumed by the fuel cells. Many hydrogen-production processes, however, produce an impure hydrogen stream, which may also be referred to as a mixed gas stream that contains hydrogen gas and other gases. Prior to delivering this stream to a fuel cell or stack of fuel cells, the mixed gas stream may be purified, such as to remove undesirable impurities.

SUMMARY OF THE DISCLOSURE

The present disclosure is directed to hydrogen purification devices, components of hydrogen purification devices, and fuel processing and fuel cell systems that include hydrogen purification devices. The hydrogen purification devices include an enclosure that forms a pressure vessel, which contains a separation assembly adapted to receive under pressure a mixed gas stream containing hydrogen gas and other gases and to produce a stream that contains pure, or at least substantially pure, hydrogen gas therefrom. In some embodiments, the enclosure is sealed without gaskets. The separation assembly includes at least one hydrogen-permeable and/or hydrogen-selective membrane, and in some embodiments, the hydrogen-selective membrane is permanently and directly secured to the enclosure. In some embodiments, the membrane is welded, diffusion bonded or brazed directly to the enclosure. In some embodiments, a portion of the hydrogen-selective membrane forms a portion of the sealed enclosure, and, in some embodiments, an interface is formed from consumed portions of the hydrogen-selective membrane and the enclosure.

Many other features of the present disclosure will become manifest to those versed in the art upon making reference to the detailed description which follows and the accompanying sheets of drawings in which preferred embodiments incorporating the principles of this disclosure are disclosed as illustrative examples only.

BRIEF DESCRIPTION OF THE DRAWINGS

FIG. 1 is a schematic view of a hydrogen purification device.

FIG. 2 is a schematic cross-sectional view of a hydrogen purification device illustrating examples of separation assemblies that include a hydrogen-selective membrane.

FIG. 3 is a schematic cross-sectional view of a hydrogen purification device constructed according to the present disclosure.

FIG. 4 is a fragmentary cross-sectional detail showing portions of the hydrogen-selective membrane, the membrane support, and the permeate-side end plate of the device of FIG. 3.

FIG. 5 is a schematic cross-sectional view of another hydrogen purification device constructed according to the present disclosure.

FIG. 6 is a fragmentary cross-sectional detail showing the hydrogen-selective membrane, the membrane support, the membrane pad, and the permeate-side end plate of the device of FIG. 5.

FIG. 7 is a fragmentary cross-sectional detail showing a hydrogen purification device containing a variation of the membrane pad of FIG. 6.

FIG. 8 is a fragmentary cross-sectional detail schematically illustrating a perimeter seal formed by welding the membrane to the enclosure of the hydrogen purification device.

FIG. 9 is a fragmentary cross-sectional detail schematically illustrating a seal formed by diffusion bonding the membrane to the enclosure of the hydrogen purification device.

FIG. 10 is a fragmentary cross-sectional detail schematically illustrating a seal formed by brazing the membrane to the enclosure of the hydrogen purification device.

FIG. 11 is an exploded isometric view of another hydrogen purification device constructed according to the present disclosure.

FIG. 12 is a schematic cross-sectional view of another hydrogen purification device constructed according to the present disclosure.

FIG. 13 is a schematic cross-sectional view of another hydrogen purification device constructed according to the present disclosure.

FIG. 14 is an exploded isometric view of a hydrogen purification device according to the present disclosure that includes an insulated heating assembly.

FIG. 15 is a schematic diagram of a fuel processing system that includes a fuel processor and a hydrogen purification device constructed according to the present disclosure.

FIG. 16 is a schematic diagram of a fuel processing system that includes a fuel processor integrated with a hydrogen purification device according to the present disclosure.

FIG. 17 is a schematic diagram of another fuel processor that includes an integrated hydrogen purification device constructed according to the present disclosure.

FIG. 18 is a schematic diagram of a fuel cell system that includes a hydrogen purification device constructed according to the present disclosure.

DETAILED DESCRIPTION AND BEST MODE OF THE DISCLOSURE

A hydrogen purification device is schematically illustrated in FIG. 1 and generally indicated at 10. Device 10 includes a body, or enclosure, 12 that defines an internal compartment 18 in which a separation assembly 20 is positioned. A mixed gas stream 24 containing hydrogen gas 26 and other gases 28 is delivered under pressure to the internal compartment. More specifically, the mixed gas stream is delivered to a mixed gas region 30 of the internal compartment and into contact with separation assembly 20. Separation assembly 20 includes at least one hydrogen-selective and/or hydrogen permeable membrane 46 and upon receipt of the mixed gas stream under pressure is adapted to produce therefrom a permeate, or hydrogen-rich, stream 34 containing hydrogen gas of greater purity than in the mixed gas stream and a byproduct stream 36 containing at least a substantial portion of the other gases. Stream 34 typically will contain pure, or at least substantially pure, hydrogen gas. However, it within the scope of the disclosure that stream 34 may at least initially also include a carrier, or sweep, gas component (with the appropriate addition of at least one input port in the permeate region for the sweep gas).

In the illustrated example, the first portion of the mixed gas stream that passes through the separation assembly enters a permeate region 32 of the internal compartment. This portion of the mixed gas stream forms hydrogen-rich permeate stream 34, and the second portion of the mixed gas stream that does not pass through the separation assembly forms a byproduct stream 36, which contains at least a substantial portion of the other gases. Illustrative examples of these "other gases" that individually or collectively may be present in the byproduct stream include one or more of carbon dioxide, carbon monoxide, unreacted feedstock from which the mixed gas stream was formed, water, nitrogen and methane. The foregoing examples are not required to be present in all mixed gas streams, as the composition of the "other gases" present in a particular mixed gas stream will tend to vary according to such factors as the process by which the mixed gas stream was formed, the reactants from which the mixed gas stream was formed, the operating conditions during the formation of the mixed gas stream, etc. Byproduct stream 36 will typically contain a portion of the hydrogen gas present in the mixed gas stream. It is also within the scope of the disclosure that the separation assembly is adapted to trap or otherwise retain at least a substantial portion of the other gases, which will be removed as a byproduct stream as the assembly is replaced, regenerated, or otherwise recharged.

In FIG. 1, streams 24, 34, and 36 are meant to schematically represent that each of streams 24, 34, and 36 may include more that one actual stream flowing into or out of device 10. For example, device 10 may receive plural feed streams 24, a single stream 24 that is divided into plural streams prior to contacting separation assembly 20, or simply a single stream that is delivered into compartment 18. Similarly, the permeate and mixed gas streams 34 and 36 may respectively be withdrawn as single streams or as two or more streams.

Device 10 typically is operated at elevated temperatures and/or pressures. For example, device 10 may be operated at (selected) temperatures in the range of ambient temperatures up to 700° C. or more. In many embodiments, the selected temperature will be in the range of 200° C. and 500° C., in other embodiments, the selected temperature will be in the range of 250° C. and 400° C. and in still other embodiments, the selected temperature will be 400° C.±either 25° C., 50° C., or 75° C. Device 10 may be operated at (selected) pressures in the range of approximately 50 psi and 1000 psi or more. In many embodiments, the selected pressure will be in the range of 50 psi and 250 or 500 psi, in other embodiments, the selected pressure will be less than 300 psi or less than 250 psi, and in still other embodiments, the selected pressure will be 175 psi±either 25 psi, 50 psi, or 75 psi.

As a result, enclosure 12 typically is a pressure vessel that is configured to withstand the elevated temperatures and/or pressures discussed above. Additionally, the enclosure must be sufficiently sealed for proper operation of the hydrogen purification device. It should be understood that as used herein with reference to the enclosure, the term "sealed" refers to the gas tightness or integrity of the enclosure, or the ability of the enclosure to contain gas streams and prevent those gas streams and/or other gas streams from entering and/or exiting the enclosure except through intended ports, such as the input, product, and byproduct ports 64, 66, and 68 discussed below. Moreover, it should be understood that as used herein with reference to operating parameters like temperature or pressure, the term "selected" refers to defined or predetermined threshold values or ranges of values, with device 10 and any associated components being configured to operate at or within these selected values. These selected operating parameters may be defined or predetermined according to such factors as the particular application in which the corresponding structure is being used, the composition of the fluid streams present therein, the structure and components of the corresponding device, user preferences, regulatory and/or safety requirements, etc. As a further illustration, a selected operating temperature may be an operating temperature above or below a specific temperature, within a specific range of temperatures, or within a defined tolerance from a specific temperature, such as within 5%, 10%, etc. of a specific temperature.

In embodiments of the hydrogen purification device 10 in which the device is operated at an elevated operating temperature, heat needs to be applied to the device to heat the device to the selected operating temperature and/or to maintain the device at this temperature or within a selected range of this temperature. For example, this heat may be provided by any suitable heating assembly 42. Illustrative examples of heating assembly 42 have been schematically illustrated in FIG. 1. It should be understood that assembly 42 may take any suitable form, including mixed gas stream 24 itself. Illustrative examples of other suitable heating assemblies include one or more of a resistance heater, a burner or other combustion region that produces a heated exhaust stream, heat exchange with a heated fluid stream other than mixed gas stream 24, electric heaters (cartridge, band, etc.), etc. When a burner or other combustion chamber is used, a fuel stream is consumed. Byproduct stream 36 may form all or a portion of this fuel stream. For example, the hydrogen purification device may be designed to produce a byproduct stream containing as minimal an amount of hydrogen gas as possible, thereby maximizing the yield of purified hydrogen gas. The hydrogen purification device additionally or alternatively may be designed to produce a byproduct stream containing sufficient hydrogen gas to provide the required fuel for a burner assembly to maintain the hydrogen purification device at a desired operating temperature.

At 42' in FIG. 1, schematic representations have been made to illustrate that the heating assembly may deliver the heated fluid stream external device 10, such as within a jacket that surrounds or at least partially surrounds the enclosure, by a stream that extends into the enclosure or through passages in the enclosure, or by conduction, such as with an electric resistance heater or other device that radiates or conducts electrically generated heat. The required heating may be provided by a single heating assembly, or by a combination of two or more heat sources.

As discussed, separation assembly 20 includes one or more hydrogen-permeable and/or hydrogen-selective membranes 46. The membranes may be formed of any material that is suitable for use in the operating environment and parameters in which purification device 10 is operated and which permits hydrogen gas to permeate or otherwise pass through the membrane while preventing other components of the mixed gas stream from passing through the membrane. In other words, the membranes should be formed from materials that are chemically and thermally stable at the operating temperatures and pressures experienced in device 10, especially when exposed to the mixed gas, product and byproduct streams and/or when cycled between heated/pressurized use configurations, and unheated/depressurized non-use configurations.

Examples of suitable materials for membranes 46 include palladium and palladium alloys, and especially thin films of such metals and metal alloys. Palladium alloys have proven particularly effective, especially palladium with 35 wt % to 45 wt % copper, such as a membrane that contains 40 wt % copper. These membranes are typically formed from a thin foil that is approximately 0.001 inches thick. It is within the scope of the present disclosure, however, that the membranes may be formed from hydrogen-permeable and/or hydrogen-selective materials, including metals and metal alloys other than those discussed above as well as non-metallic materials and compositions, and that the membranes may have thicknesses that are greater or less than discussed above. For example, the membrane may be made thinner, with commensurate increase in hydrogen flux. Examples of suitable mechanisms for reducing the thickness of the membranes include rolling, sputtering, and etching. A suitable etching process is disclosed in U.S. Pat. No. 6,152,995, the complete disclosure of which is hereby incorporated by reference for all purposes. Examples of various membranes, membrane configurations, and methods for preparing the same are disclosed in U.S. Pat. Nos. 6,221,117 and 6,319,306, the complete disclosures of which are hereby incorporated by reference for all purposes.

In FIG. 2, illustrative examples of suitable configurations for membrane(s) 46 are shown. As shown, membrane 46 includes a mixed-gas surface 48 which is oriented for contact by mixed gas stream 24, and a permeate surface 50, which is generally opposed to surface 48. At 46', membrane 46 is illustrated as a foil or film. At 46'', the membrane is supported by an underlying support 54, such as a mesh or expanded metal screen, or a ceramic or other porous material. At 46''', the membrane is coated or formed onto or otherwise bonded to a porous member 56. It should be understood that the membrane configurations discussed above have been illustrated schematically in FIG. 2 and are not intended to represent every possible configuration within the scope of the disclosure.

For example, although membrane 46 is illustrated in FIG. 2 as having a planar configuration, it is within the scope of the disclosure that membrane 46 may have non-planar configurations as well. For example, the shape of the membrane may be defined at least in part by the shape of a support 54 or member 56 upon which the membrane is supported and/or formed. As such, membranes 46 may have concave, convex or other non-planar configurations, especially when device 10 is operating at an elevated pressure. As another example, membrane 46 may have a tubular configuration.

As discussed, enclosure 12 defines an internal compartment 18 in which separation assembly 20 is positioned. In the embodiments shown in FIG. 2, enclosure 12 includes a pair of end plates 60 that are joined by a perimeter shell 62. It should be understood that device 10 has been schematically illustrated in FIG. 2 to show representative examples of the general components of the device without intending to be limited to geometry, shape, and size. For example, end plates 60 typically are thicker than the walls of perimeter shell 62, but this is not required. Similarly, the thickness of the end plates may be greater than, less than, or the same as the distance between the end plates. As a further example, the thickness of membrane 46 has been exaggerated for purposes of illustration.

In FIG. 2, it can be seen that mixed gas stream 24 is delivered to compartment 18 through an input port 64, hydrogen-rich (or permeate) stream 34 is removed from device 10 through one or more outlet or product ports 66, and the byproduct stream is removed from device 10 through one or more byproduct ports 68. The ports are shown extending through various ones of the end plates to illustrate that the particular location on enclosure 12 from which the gas streams are delivered to and removed from device 10 may vary. It is also within the scope of the disclosure that one or more of the streams may be delivered or withdrawn through shell 62 and/or through a perimeter edge of the end plates.

It is further within the scope of the disclosure that ports 64, 66, and 68 may include or be associated with flow-regulating and/or coupling structures. Examples of these structures include one or more of valves, flow and pressure regulators, connectors or other fittings, and/or manifold assemblies that are configured to permanently or selectively fluidly interconnect device 10 with upstream and downstream components. For purposes of illustration, these flow-regulating and/or coupling structures are generally indicated at 70 in FIG. 2. For purposes of brevity, structures 70 have not been illustrated in every embodiment. Instead, it should be understood that some or all of the ports for a particular embodiment of device 10 may include any or all of these structures, that each port does not need to have the same, if any, structure 70, and that two or more ports may in some embodiments share or collectively utilize structure 70, such as a common collection or delivery manifold, pressure relief valve, fluid-flow valve, etc.

Membranes 46 may be mounted, supported, secured, and/or positioned within compartment 18 in any suitable way. For example, in FIG. 3 device 10 includes an enclosure 12 with a feed-side end plate 59 and a permeate-side end plate 61. This illustrative construction is used in the examples shown in FIGS. 3-11, although it is within the scope of the present disclosure that the enclosure may be formed from any suitable number of components that collectively define the pressure vessel for the pressure-driven separation processes described herein. As indicated in FIG. 3, each end plate includes an inner perimeter 72, an outer perimeter 74, and a sealing region 76 that extends between the inner and outer perimeters. As illustrated, the sealing region extends linearly between the inner and outer perimeters. Other configurations may be used without departing from the scope of the present disclosure. Sealing regions 76 provide potential, or possible, locations for seals between membrane 46 and end plates 59 and 61. It should be understood that as used herein with reference to the enclosure, the term "seals" refers to structures that prevent a potential gas leak path between the components of the enclosure and/or between the enclosure and the membrane.

End plate 59 includes input port 64 and byproduct port 68, while end plate 61 includes outlet, or product, port 66. As discussed, the illustrated orientations and positions of the ports is not required and may vary within the scope of the present disclosure. The illustrated end plate 59 includes a chamber, or recess, 84 that defines a gas flow path that permits mixed gas stream 24 to be exposed to and flow along mixed gas surface 48 of membrane 46, thereby promoting greater exposure of the mixed gas stream to the membrane and thus allowing more of the hydrogen gas in the mixed gas stream to pass to the permeate region of the enclosure. In the illustrative embodiment, end plate 61 includes a chamber, or recess, 86 that is configured to receive membrane support 54 and to provide a gas flow path for the portion of the mixed gas stream that permeates through the membrane. End plate 61 also may include a second chamber, or recess, 90, as shown in FIG. 6, which is configured to receive at least one membrane pad 94, which is further discussed below. None of these chambers is required to all embodiments, although the permeate region of the enclosure preferably defines or otherwise includes a suitable support for the membrane and a suitable gas flow path through which the permeated hydrogen gas may flow and be drawn away from the membrane. Similarly, the mixed gas region of the enclosure preferably includes a suitable gas flow path for the portion of the mixed gas stream that permeates though the membrane to be collected and removed from the enclosure, such as through product port 66.

In the following discussion, enclosure 12 is described as being formed from end plates 59 and 61, with each end plate including a chamber or gas-flow region that is spanned by membrane 46. In other words, the membrane extends from a gas-tight seal with at least one of the end plates or other portion of the enclosure to divide the enclosure into the permeate and mixed gas regions. It is within the scope of the present disclosure that the permeate and the mixed gas regions of the enclosure may be formed from end plates to which a separately formed perimeter shell is joined and extends, with this shell defining at least a portion of the gas-flow region of the corresponding side of the enclosure. A benefit of forming the enclosure from end plates that do not require a separate perimeter shell is that the enclosure will have fewer interfaces (that are formed between abutting portions of the enclosure) that need to be sealed to prevent gas leaks. Enclosure 12, including end plates 59 and 61, may be formed from any suitable material that is chemically and thermally stable at the elevated operating temperatures and/or pressures of device 10, especially over prolonged periods of time and/or with repeated heating and cooling off cycles. For example, end plates may be formed from stainless steel, a Monel™ alloy, an Incoloy™ alloy, etc. Other suitable materials and configurations are disclosed in U.S. Pat. No. 6,569,227, the complete disclosure of which is hereby incorporated by reference for all purposes.

Unlike conventional hydrogen purification devices in which the membranes are located and supported entirely within an interior compartment of the enclosure, devices 10 according to the present disclosure include at least one membrane 46 that is permanently and directly mounted to the enclosure to form a gas-tight seal therewith, such as by extending at least between end plates 59 and 61. An illustrative example of this configuration is schematically illustrated in FIGS. 3 and 5. Membrane 46 includes a central region 80 and an outer perimeter region 82. The central region may also be referred to as a hydrogen-permeation region and refers to the portion of the hydrogen-selective membrane that extends internal of the inner perimeters of the end plates and which separates the internal compartment of the enclosure into permeate and mixed gas regions. Preferably, at least a substantial portion, if not all, of the central region of the membrane is exposed to the mixed gas stream during use of the hydrogen purification device and is adapted to assist in the separation of the mixed gas stream into the product and byproduct streams.

The outer perimeter region 82 of membrane 46 refers to the portion of the membrane that extends beyond, or external, the inner perimeters of the end plates. As discussed, the outer perimeter region extends from the inner perimeters of the end plates (or perimeter shell) and toward the outer perimeters of the end plates. In other words, the membrane's cross-sectional area (taken at a plane parallel to its elongate length) is greater than the compartment's cross-sectional area (taken along the same plane). In the illustrated examples of FIGS. 3 and 5, the outer perimeter region of membrane 46 extends to the outer perimeter of the end plates, with the membrane including an outer perimeter, or edge, that extends to the outer perimeters of the end plates. The edge is perhaps best seen in FIGS. 4 and 6, where it is indicated at 83. It is within the scope of the disclosure that the outer perimeter region of membrane 46 may extend only partway between the inner and outer perimeters of the end plates (i.e., only partially across the sealing regions), or that the outer perimeter region of the membrane may extend beyond the outer perimeters of the end plates (i.e., exterior of the enclosure). In other words, the membrane has a cross-sectional area measured in the plane of, or along the surface of, the membrane that exceeds the cross-sectional area of the internal compartment across which the membrane extends.

As discussed, device 10 utilizes one or more membranes 46 to separate the mixed gas stream into product and byproduct streams through a pressure-driven separation process. As such, the mixed gas stream tends to be delivered into contact with the permeate surface of the membrane(s) at a higher pressure than the product stream leaves the enclosure. The membrane(s), which tend to be very thin, need to be supported, typically on its permeate surface, against this pressure, such as by a support. Illustrative membrane supports are schematically illustrated at 54 in FIGS. 3-6.

The membrane support should extend across a substantial portion, if not all, of the central region of the membrane and should be formed from a porous or otherwise gas-permeable structure through which any gas that passes through the membrane may flow, such as to product port 66. Preferably, the gas may flow in both parallel and transverse directions through the support. For example, support 54 may be formed from one or more mesh, ceramic, or expanded metal materials. In experiments, supports that include a screen assembly that includes two or more screens, such as may be (but are not required to be) sintered or otherwise secured together, has proven effective. For example, a fine mesh or expanded metal screen may be positioned to directly contact the membrane, with this screen being itself supported by one or more coarser screens.

In FIG. 3, membrane support 54 is shown being received into a recess, or chamber, 86 of end plate 61. Chamber 86 is sized to receive and position the membrane support such that the sealing region 76 of the end plate and a membrane-engaging surface 87 of the membrane support are generally coplanar with each other. This configuration is schematically illustrated in FIG. 4. As shown, the outer edge, or perimeter, 88 of the membrane support faces the inner perimeter 72 of the end plate. It is within the scope of the disclosure that these perimeter portions may directly abut each other and/or that there may be a gap, typically a small gap, between the inner perimeter of the end plate (or perimeter shell) and the outer perimeter of the membrane support. Regardless of whether the end plate includes a chamber that is sized to receive the support, the membrane support will be positioned within the internal compartment of the enclosure, and therefore the membrane support will include an outer perimeter that abuts or extends proximate to the inner perimeter of the end plate (or perimeter shell) of the enclosure.

Because the sealing region 76 of end plate 61 and the membrane-contacting surface 87 of membrane support 54 are preferably positioned in a generally, or completely, coplanar relationship, it follows that there will be a seam, gap, or other transition, or transition region 92, formed between the outer perimeter of the membrane support and the inner perimeter of the end plate. As shown in FIG. 4, the membrane extends across this transition region. During operation of the hydrogen purification device, and perhaps more significantly during thermal and pressure cycling of the device, the deflection and/or engagement of these portions may cause leaks in the membrane, such as by piercing, wrinkling, weakening or otherwise damaging the membrane. It should be understood that holes, cuts, or other apertures in the membrane provide flow paths through which the other gases may pass through the membrane and thereby reduce the purity of the product hydrogen stream. Accordingly, it is preferable for this transition region to be as smooth and small as possible to reduce the likelihood of damage to the membrane.

FIGS. 5 and 6 demonstrate that hydrogen purification devices 10 according to the present disclosure may (but are not required to) include at least one membrane pad 94 that is adapted to extend between the transition region and the membrane to prevent the membrane from directly engaging the transition region. As such, pad 94 may be described as extending in contact with the permeate surface 50 of the membrane and further extending in contact with both the membrane support and the sealing region of the permeate-side end plate. Pad 94 may be described as extending across a portion of the membrane support and across a portion of the sealing region of the permeate-side end plate.

Pad 94 may include any suitable structure that is configured to span the transition region between the enclosure and the membrane support and to prevent the permeate surface of the membrane from engaging the transition region. For example, and as perhaps best seen in FIG. 6, pad 94 is used to span or "soften" transition region 92 and to prevent membrane 46 from engaging the transition region. Pad 94 may be formed from any suitable material that is thermally and chemically stable in the operating environment to which it will be exposed in the hydrogen purification device and which reduces the likelihood of the membrane being wrinkled, punctured or otherwise damaged by contact with the transition region.

Unlike a gasket or other structure that is used in conventional gas purification devices and which is required to form a gas-tight, or gas-impermeable, seal between the membrane and adjacent structure, pad 94 is not required to form such a seal. In fact, the operation of device 10 should not be affected whether or not pad 94 forms any form of gas-tight seal between the membrane and the enclosure or support. Therefore, it is within the scope of the present disclosure that the pad does not create a gas-impermeable seal between membrane 46 and enclosure 12 or support 54. Thus, pad 94 need not be formed from compressible material or, if formed from compressible material, need not be under heavy compression.

For example, pad 94 may be formed from a gas-permeable material or a gas-impermeable material. The pad therefore may or may not be hydrogen-selective or hydrogen-permeable. As another example, the pad may be formed from a gasket that is under only light compression, such as 20% compression or less (typically compressible gaskets need at least 30% compression, and preferably closer to 60% compression to create a gas-impermeable seal). An illustrative, non-exclusive example of such a gasket used for pad 94 is a graphite gasket, such as sold by Union Carbide under the trade name GRAFOIL™. As a practical example, when a 5 mil GRAFOIL™ gasket is used and compressed to 4 mil, the desired protection of the membrane is provided even though this degree of compression should be insufficient to provide a gas-tight seal. As a further example, pad 94 may be formed from metal, from a rigid material, and/or from an incompressible material (i.e., a material that is not reduced in thickness more than marginally, if any, when assembled into the device). If a metal pad is used, illustrative (non-exclusive) examples of suitable materials include aluminum, copper, and/or steel.

In FIG. 6, pad 94 is shown positioned in a recess, or chamber, 90 that is sized to receive and position the pad so that it covers the transition region and positions a membrane-engaging surface 95 of the pad in a coplanar relationship with the sealing region 76 of the permeate-side end plate. In such a configuration, it should be understood that the inclusion of the pad will offset the coplanar positioning of the membrane-engaging surface of the membrane support and the sealing region of the permeate-side end plate. Pad 94 and/or compartment 90 are not required to all devices 10 according to the present disclosure.

Pad 94 may have any suitable configuration and thickness. In the illustrative examples, the pad covers the transition region but does not extend along most of the central portion of the membrane. Because the membrane is likely to be urged toward the membrane support during use of device 10, it follows that pad 94 should preferably be relatively thin so as not to provide a steep edge around which the membrane will bend during use. The engagement of the pad by the membrane may promote the use of a compressible pad even though the pad is not compressed to form a gas-tight seal. As a further example, the pad may include a tapered, or sloped, inner perimeter 96, such as shown in FIG. 7. This tapered configuration may reduce the likelihood that the membrane is creased or otherwise damaged by engaging (repeatedly) the pad, such as during pressurization and depressurization of the device.

Membrane 46 may be secured to enclosure 12 by any suitable method and/or structure. For example, membrane 46 may be permanently and directly secured to enclosure 12, such as to one or both of end plates 59 and 61. As used herein with reference to mounting of the membrane, the term "permanently" refers to mounting the membrane to the enclosure using a suitable method such that, once the membrane is mounted, disengaging the membrane from the enclosure requires cutting, removing portions of, or otherwise damaging at least a portion of the membrane or the enclosure. Additionally, as used herein with reference to mounting of the membrane, the term "directly" refers to mounting the membrane to the enclosure without the use of intermediate structures that interconnect the membrane to the enclosure. For example, a membrane that is mounted on a frame, which is itself supported within the internal compartment of the enclosure, is not directly mounted to the enclosure. As a more direct example, a permanently and directly mounted membrane according to the present disclosure will divide the internal compartment 18 of enclosure 12, which is the primary pressure vessel of the hydrogen purification device, into the mixed gas region 30 and the permeate region 32. As discussed in more detail herein, the membrane interfaces directly with the enclosure to provide a gas-tight seal with the enclosure that does not require the use of gaskets or other compressible seal members to form this seal.

Membrane(s) 46 are directly and permanently secured to the enclosure through the formation of an interface with a gas-tight seal between the membrane and the enclosure. The interface permanently and directly mounts the membrane 46 to the enclosure and provides a gas-tight seal between the membrane and the enclosure. By "gas-tight," it is meant that the mixed gas stream is prevented from passing from the mixed gas region of the enclosure's internal compartment to the exterior of the enclosure other than through the defined ports in the permeate-side end plate and/or to the permeate region of the internal compartment other than by passing through the hydrogen-selective membrane itself. In other words, the mounting process preferably establishes a seal between the membrane and the enclosure that prevents a leak path from existing between the mixed gas and permeate regions of the enclosure, and between these regions and the exterior of the enclosure.

An illustrative, but not exclusive, example of a suitable process for permanently and directly mounting membrane(s) 46 to the enclosure is through a destructive bonding process in which portions of at least one, if not both, of the membrane and the enclosure are consumed to form the gas-tight seal between the membrane and the enclosure. As used herein with reference to the gas-tight seal, the term "consumed" refers to changing one or more physical and/or chemical characteristics of the membrane and the enclosure to establish a seal or bond therebetween, including forming an alloy from the consumed portions of the membrane and/or the enclosure and/or mutually diffusing atoms between the membrane and the enclosure. Illustrative examples of destructive bonding processes include welding and diffusion bonding. In another example of a suitable mounting method, the membrane and the enclosure are permanently and directly secured together to form the gas-tight seal by brazing. Each of these illustrative examples is discussed in more detail below and schematically illustrated in FIGS. 8-10, respectively. Other illustrative suitable methods for permanently and directly mounting membrane 46 to enclosure 12 include laser welding, soldering, low-temperature brazing, and the like.

In FIG. 8, interface 100 is formed by welding membrane 46 to sealing regions of the enclosure, such as the sealing regions of end plates 59 and 61. The welding process creates a seal 108 between consumed portion 102 of membrane 46 and consumed portions 104 and 106 of end plates 59 and 61, as has been somewhat schematically depicted in FIG. 8. In the welding process, an alloy 109 is formed from the consumed portions of the membrane and the end plates. Any suitable welding process may be used to weld membrane 46 to end plates 59 and 61 (or to one or more other portions of the enclosure). While not required, it is within the scope of the present disclosure that the welding process may introduce at least one additional metal or other component into alloy 109. For example, tungsten inert gas (TIG) welding may be used. In the TIG process, wire (such as Nichrome and/or Monel wire) is introduced into groove, or weld joint, 57. During the welding process, a liquidus phase is formed from the wire and portions of the membrane and the enclosure. The inclusion of the additional component promotes compatibility and stability of the solidified mass of wire, membrane and enclosure. Although interface 100 is illustrated as being proximate the outer perimeter regions of membrane 46 and enclosure 12, it is within the scope of the disclosure that the interface may extend proximate the inner perimeter regions of membrane 46 and enclosure 12, along any one or more portions of sealing regions 76, and/or any other suitable location to establish a seal or bond between the membrane and the enclosure. In other words, the interface will typically extend at least partially between the outer and inner perimeters of the welded portions of the enclosure, such as end plates 59 and 61. Although not required, the interface established by a welding process preferably terminates prior to the inner perimeter of the enclosure (i.e., does not extend into the internal compartment).

In FIG. 9, interface 110 is formed by diffusion bonding of membrane 46 to end plates 59 and 61. Diffusion bonding creates a seal 118 between consumed portion 112 of membrane 46 and consumed portions 114 and 116 of end plates 59 and 61 without forming a liquidus phase of these portions. It should be understood that as used herein with reference to the membrane, the term "diffusion bonding" refers to a process where there is a mutual diffusion of atoms and/or molecules of the materials to be bonded. Although interface 110 is formed along at least a substantial portion, if not all, of sealing regions 76, it is within the scope of the disclosure that the interface may be formed along any one or more portions of sealing regions 76, between the outer perimeter region of the membrane and the enclosure, and/or any other suitable location to establish a seal or bond between membrane 46 and enclosure 12. Both diffusion bonding and welding result in an alloy or other composition that was not present prior to the destructive bonding process.

FIG. 10 illustrates the formation of a gas-tight seal between membrane 46 and enclosure 12 through a brazing process. In the brazing process, neither the enclosure nor the membrane is consumed. Instead, a brazing material 126 forms a liquidus phase that upon solidifying forms a gas-tight seal 128 between the membrane and the enclosure, such as between the sealing regions of end plates 59 and 61. As used herein, the term "brazing" refers to joining components by flowing a brazing material between those components. Any suitable brazing material may be used, but preferably that material turns liquidus at lower temperatures than the membrane and the end plates. The brazing material forms a gas-tight seal 128 between membrane 46 and end plates 59 and 61 (or other portion(s) of the enclosure). Although seal 128 is shown between the outer perimeter regions of the membrane and the enclosure, it is within the scope of the disclosure that seal 128 may be located along any one or more portions of sealing regions 76, and any other suitable location to establish a seal or bond between the membrane and the enclosure.

The illustrative examples of FIGS. 8-10 may be described as providing examples of membranes 46 that themselves form a portion of the sealed enclosure. By this it is meant that the pressure vessel is partially defined by the membrane, instead of the membrane simply being supported within the internal compartment of the sealed enclosure (pressure-vessel). Another way of describing this relationship is that the membrane forms a portion of the gas-tight seal of the sealed enclosure.

Although the seals discussed above are shown to be continuous seals between membrane 46 (such as outer perimeter region 82) and enclosure 12, it is within the scope of the disclosure that two or more distinct or noncontinuous seals may be used. For example, a first gas-tight seal may be formed between membrane 46 and a first portion of the enclosure, such as a first one of end plates 59 and 61. Thereafter, a second gas-tight seal may be formed between the second one of end plates 59 and 61 and the membrane and/or the first one of the end plates. For example, membrane 46 may be permanently and directly mounted to a sealing region of one of the end plates and/or to the internal surface of the enclosure, and thereafter the end plates or other portions of the enclosure may be secured together to seal the pressure vessel. Preferably, however, the gas-tight seal between the membrane and the enclosure is formed in a single step in which the membrane is permanently and directly mounted to the enclosure to form the gas-tight seal described herein.

Although the preceding illustrated examples depict the membrane extending to the outer perimeter of the sealing regions of end plates 59 and 61, or beyond, it is not required that the membrane extend completely across the sealing regions. A benefit of the membrane extending to, or even beyond, the outer perimeter of the sealing regions of the portions of the enclosure to which the membrane will be directly and permanently mounted is that the seal may be established from the outer, or exterior, portion of the enclosure, with this seal typically extending at least partially toward the interior of the enclosure.

FIG. 11 illustrates a less schematic example of a hydrogen purification device 10 containing an enclosure 12 that forms a pressure vessel with an internal compartment 18 that is divided into mixed gas and permeate regions 30 and 32 by at least one hydrogen-selective membrane 54 that spans the internal compartment and which is directly and permanently secured to the enclosure to define a gas-tight seal therewith. Illustrative ones of the above-described elements and sub-elements that may be present in devices 10 according to the present disclosure are also graphically illustrated in FIG. 11. The embodiment shown in FIG. 11 may include any of the variations and/or optional structure described herein without departing from the scope of the disclosure.

The configurations of the hydrogen purification devices, and the individual components thereof, discussed above and which have been schematically illustrated herein are not intended to represent every possible configuration within the scope of the disclosure. Similarly, the thicknesses and other dimensions of the illustrated membranes, supports, enclosures, etc. have been exaggerated for the purpose of illustration and are not intended to be precise representations of the relative sizes of these components. For example, the thickness of the membranes has been exaggerated. Similarly, the shape and relative dimensions of the end plates have been simplified for the purpose of illustration. As discussed in more detail herein, the outer perimeter of the end plates, such as proximate sealing regions 76 may be tapered or otherwise configured to promote a gas-tight seal. For example, the end plates may include a tapered region, or groove, such as illustrated in FIGS. 8-10. This optional region may have any suitable shape that is configured to facilitate strong seals when membrane 46 is secured to enclosure 12 by welding or brazing.

Further examples of hydrogen purification devices 10 constructed according to the present disclosure are shown in FIGS. 12 and 13 and generally indicated at 210. Unless otherwise specified, device 210 may selectively include any of the elements, subelements, and variations as the other devices illustrated, described, and/or incorporated herein. Illustrative (non-exclusive) examples of these previously discussed components are indicated in FIGS. 12 and 13. Similar to the previously described examples, device 210 includes an enclosure 12 that defines a pressure vessel with an internal compartment 18 that is divided into mixed gas and permeate regions 30 and 32 by at least one hydrogen-selective membrane 46 that is permanently and directly mounted to the enclosure to form a gas-tight seal therewith.

The illustrated example of enclosure 12 includes a pair of end plates 59 and 61, as well as a perimeter shell, or perimeter shell portion, 214. Perimeter shell 214 extends between the end plates and defines with the end plates the internal compartment 18 of the enclosure. The perimeter shell may also be referred to as a frame that forms a portion of the pressure vessel of the enclosure. In the illustrated examples, membrane 46 is permanently and directly mounted to the perimeter shell, which in turn is permanently and directly mounted to the adjacent portions of the enclosure, such as end plates 59 and 61. The previously described destructive and other processes for forming gas-tight seals may be used to secure the membrane to the perimeter shell and the perimeter shell to the end plates. Accordingly, gas-tight seals are formed, such as by the above-described destructive bonding processes, between the membrane and the perimeter shell and/or the end plates and between the shell and the end plates. These seals are indicated generally at 218 in FIG. 12.

In FIGS. 12 and 13, membrane 46 is permanently and directly mounted to a permeate surface 216 of the perimeter shell, with the membrane being supported on its permeate surface 50 by a membrane support 54. It is within the scope of the present disclosure that a membrane 54 may be permanently and directly secured to the mixed gas surface of the shell and/or to another portion of the enclosure. It is also within the scope of the present disclosure that two or more perimeter shells may be used. Perimeter shell 214 may be formed from any suitable material that is stable in the operating environment in which the hydrogen purification device is used. Shell 214 may be formed from the same material(s) as the rest of the enclosure, but this is not required. Therefore, shell 214 may alternatively be formed from a different composition than the end plates.

Perimeter shell portion 214 spaces the end plates apart from each other and thereby defines at least a portion of the enclosure's pressure vessel and internal compartment. In the illustrative example shown in FIG. 12, perimeter shell portion, or frame, 214 has an inner perimeter, or inner surface, 222 that projects into the enclosure's internal compartment relative to the inner perimeters of one (FIG. 13) or both (FIG. 12) of the end plates. In both illustrative examples, the inner perimeter 222 of the perimeter shell is smaller than the outer perimeter, or edge, 88 of the membrane support. Expressed in different terms, the perimeter shell portion overlaps with membrane support 54. This construction not only provides another example of a gasketless hydrogen purification device (i.e., a hydrogen purification device that does not require a compressible, or other, gasket to form a seal between the membrane and the enclosure to divide the enclosure's internal compartment into mixed gas and permeate regions), but also provides a construction in which there is not a transition region between the enclosure and the membrane support that is directly engaged by the membrane.

A potential benefit of utilizing a perimeter shell is that at least one of the end plates may be (but is not required to be) formed without a chamber or recess for transverse flow of gas in the direction of the plane of the end plate. Instead, the perimeter shell portion defines at least a substantial portion, if not all, of the respective permeate or mixed gas region of the enclosure's internal compartment. Accordingly, it is within the scope of the present disclosure to size or otherwise select perimeter shell 214 to have a thickness (measured as the distance between the end plates) that provides a selected or desired gas flow region, such as mixed gas region 30 or permeate region 32. FIG. 13 demonstrates schematically that increasing the thickness (i.e., the distance between the mixed gas and permeate surfaces of the perimeter shell portion) of the perimeter shell portion increases the size of one of the enclosure's gas-flow paths, or regions, such as illustrated with respect to the mixed gas region. A tradeoff with this potential manufacturing benefit, namely, not having to form this chamber or gas flow passage within at least one of the end plates, is the fact that the inclusion of the perimeter shell portion increases the number of external seals for the enclosure. More particularly, the inclusion of the perimeter shell also requires two exterior seals, one between the shell and a first one of the end plates, and one between the shell and the second one of the end plates. Since any seal provides a potential for a gas leak path, care should be taken to ensure that the seals are free of leaks.

As discussed above, hydrogen purification devices 10 are typically operated at elevated temperatures and pressures. These pressures require the enclosure to be a durable pressure vessel that can withstand these forces, which act to urge the components of the enclosure away from each other, typically with several hundred pounds of force. The enclosure also must be able to withstand the thermal and pressure cycling that the enclosure experiences as it is repeatedly heated and pressurized for use, then cooled and depressurized when not in use.

As discussed, when it is desirable to heat the hydrogen purification device to an elevated temperature, a variety of heating assemblies may be used. It may also be desirable, though not required, to insulate the device, such as to reduce the heating requirements and/or to protect adjacent structure, operators, etc. from contacting the outer surface of the enclosure. FIG. 14 provides an illustrative example of an insulated heating assembly 300 that may be used with a hydrogen purification device 10 containing an enclosure 12 according to the present disclosure. As used herein, the term "hydrogen purification assembly" is used to refer to one of the hydrogen purification devices 10 described and/or illustrated herein in combination with a heating assembly 42, such as, but not limited to, the insulated heating assembly 300 described and illustrated with respect to FIG. 14. It is also within the scope of the present disclosure that a hydrogen purification device 10 and/or enclosure 12 may be used without the subsequently described insulated heating assembly 300.

As shown, a hydrogen purification device 10 is positioned between an illustrative pair of heating assemblies 42, which are indicated specifically at 322 and include heat conductive structures 323. Heat conductive structures 323 are formed from materials that are well-suited to conduct heat and are adapted to receive a heat source 324, such as an electric heater 326 that is received into a cavity 328 in the material. Other heat sources may be used in place of or in addition to the illustrated electric heaters. The heated structures distribute heat across the opposed exterior faces, or surfaces, 330 of the hydrogen purification device's enclosure 12. The heat conductive structures may be made of any suitable heat-conductive material that is thermally and chemically stable in the operating environment exterior enclosure 12, such as at the elevated temperature used to heat the enclosure and its contents to a desired operating temperature. An example of a suitable material is aluminum, although others may be used.

In the illustrated example, faces 330 and the corresponding surfaces 332 of the heat conductive structures have planar configurations so that these structures may directly abut each other across at least a substantial portion of the overlapping surfaces. It is within the scope of the present disclosure that the heat conductive structure and/or the exterior of the end plates may include or be coupled to a suitable mount that positions these components relative to each other and/or urges these structures together.

Also shown in FIG. 14 is an insulating shroud, or housing, 350 that is sized to receive device 10 and heating assemblies 322 (when present). Housing 350 may be formed from any suitable insulating material, such as a refractory ceramic, and preferably encloses the hydrogen purification device and optionally at least a portion of the heating assembly or assemblies (such as assemblies 42 or 322) to reduce the heating requirements to maintain a desired temperature (i.e., reduce heat loss) and to provide an exterior surface 352 that is at a lower temperature, and preferably a temperature that is not likely to damage objects that come into contact therewith. In the illustrated example, housing 350 is formed in two halves 352 that include internal compartments 354 into which device 10 and assemblies 322 are received. Other configurations may be used, such as configurations that include more than two components, a monolithic structure that is cast or otherwise formed around the hydrogen purification device, differently sized components, etc.

FIG. 14 also provides an illustrative example of an optional retainer 360 that is adapted to urge the sealed hydrogen purification device, heating assemblies 322 and housing 350 together. As shown, retainer 360 includes plates 362 that are urged together by any suitable connector, and preferably by springs or other connectors that bias the plates toward each other. Because the hydrogen purification device includes a sealed enclosure that is itself designed to resist the internal forces that act to separate or otherwise open the enclosure, the connectors merely are urging these structures into physical contact with each other.

A hydrogen purification device 10 constructed according to the present disclosure may be coupled to, or in fluid communication with, any source of impure hydrogen gas. Examples of these sources include gas storage devices, such as hydride beds and pressurized tanks. Another source is an apparatus that produces an exhaust or waste stream from which hydrogen gas may be recovered. Still another source is a fuel processor, which as used herein, refers to any device that is adapted to produce a mixed gas stream containing hydrogen gas from at least one feed stream containing a feedstock. Typically, hydrogen gas will form a majority or at least a substantial portion of the mixed gas stream produced by a fuel processor.

A fuel processor may produce mixed gas stream 24 through a variety of mechanisms. Examples of suitable mechanisms include steam reforming and autothermal reforming, in which reforming catalysts are used to produce hydrogen gas from a feed stream containing a carbon-containing feedstock and water. Other suitable mechanisms for producing hydrogen gas include pyrolysis and catalytic partial oxidation of a carbon-containing feedstock, in which case the feed stream contains a carbon-containing feedstock but does not contain water. Still another suitable mechanism for producing hydrogen gas is electrolysis, in which case the feedstock is water and does not include a carbon-containing feedstock. Examples of suitable carbon-containing feedstocks include at least one hydrocarbon or alcohol. Examples of suitable hydrocarbons include methane, propane, natural gas, diesel, kerosene, gasoline, and the like. Examples of suitable alcohols include methanol, ethanol, and polyols, such as ethylene glycol and propylene glycol.

A hydrogen purification device 10 that is adapted to receive mixed gas stream 24 from a fuel processor is shown schematically in FIG. 15. As shown, the fuel processor is generally indicated at 400, and the combination of a fuel processor and a hydrogen purification device may be referred to as a fuel processing system 402. Also shown in dashed lines at 42 is a heating assembly, which as discussed provides heat to device 10 and may take a variety of forms, such as those discussed and/or incorporated herein. Fuel processor 400 may take any of the forms discussed above. To graphically illustrate that a hydrogen purification device according to the present disclosure may also receive mixed gas stream 24 from sources other than a fuel processor 400, a gas storage device is schematically illustrated at 406 and an apparatus that produces mixed gas stream 24 as a waste or byproduct stream in the course of producing a different product stream 408 is shown at 410. It should be understood that the schematic representation of fuel processor 400 is meant to include any associated heating assemblies, feedstock delivery systems, air delivery systems, feed stream sources or supplies, etc.

Fuel processors are often operated at elevated temperatures and/or pressures. As a result, it may be desirable to integrate hydrogen purification device 10 with fuel processor 400 at least partially, as opposed to having device 10 and fuel processor 400 connected by external fluid transportation conduits. An example of such a configuration is shown in FIG. 17, in which the fuel processing system includes a shell or housing 412, which device 10 forms a portion of and/or extends at least partially within. In such a configuration, fuel processor 400 may be described as including device 10. Integrating the fuel processor or other source of mixed gas stream 24 with hydrogen purification device 10 enables the devices to be more easily moved as a unit. It also enables the fuel processor's components, including device 10, to be heated by a common heating assembly and/or for at least some if not all of the heating requirements of device 10 to be satisfied by heat generated by processor 400.

As discussed, fuel processor 400 is any suitable device that produces a mixed gas stream containing hydrogen gas, and preferably a mixed gas stream that contains a majority of hydrogen gas. For purposes of illustration, the following discussion will describe fuel processor 400 as being adapted to receive a feed stream 416 containing a carbon-containing feedstock 418 and water 420, as shown in FIG. 17. However, it is within the scope of the disclosure that the fuel processor 400 may take other forms, as discussed above, and that feed stream 416 may have other compositions, such as containing only a carbon-containing feedstock or only water.

Feed stream 416 may be delivered to fuel processor 400 via any suitable mechanism. A single feed stream 416 is shown in FIG. 17, but it should be understood that more than one stream 416 may be used and that these streams may contain the same or different components. When the carbon-containing feedstock 418 is miscible with water, the feedstock is typically delivered with the water component of feed stream 416, such as shown in FIG. 17. When the carbon-containing feedstock is immiscible or only slightly miscible with water, these components are typically delivered to fuel processor 400 in separate streams, such as shown in dashed lines in FIG. 17. In solid lines in FIG. 17, feed stream 416 is shown being delivered to fuel processor 400 by a feed stream delivery system 417. Delivery system 417 includes any suitable mechanism, device, or combination thereof that delivers the feed stream to fuel processor 400. For example, the delivery system may include one or more pumps that deliver the components of stream 416 from a supply. Additionally, or alternatively, system 417 may include a valve assembly adapted to regulate the flow of the components from a pressurized supply. The supplies may be located external of the fuel cell system, or may be contained within or adjacent the system.

As generally indicated at 432 in FIG. 17, fuel processor 400 includes a hydrogen-producing region in which mixed gas stream 24 is produced from feed stream 416. As discussed, a variety of different processes may be utilized in hydrogen-producing region 432. An example of such a process is steam reforming, in which region 432 includes a steam reforming catalyst 434. Alternatively, region 432 may produce stream 24 by autothermal reforming, in which case region 432 includes a suitable autothermal reforming catalyst and the fuel processor is operated at temperatures and pressures suitable for autothermal reforming. In the context of a steam or autothermal reformer, mixed gas stream 24 may also be referred to as a reformate stream. Preferably, the fuel processor is adapted to produce substantially pure hydrogen gas, and even more preferably, the fuel processor is adapted to produce pure hydrogen gas. For the purposes of the present disclosure, substantially pure hydrogen gas is greater than 90% pure, preferably greater than 95% pure, more preferably greater than 99% pure, and even more preferably greater than 99.5% pure. Examples of suitable fuel processors are disclosed in U.S. Pat. No. 6,221,117, pending U.S. patent application Ser. No. 09/802,361, which was filed on Mar. 8, 2001, and is entitled "Fuel Processor and Systems and Devices Containing the Same," and U.S. Pat. No. 6,319,306, which was filed on Mar. 19, 2001, and is entitled "Hydrogen-Selective Metal Membrane Modules and Method of Forming the Same," each of which is incorporated by reference in its entirety for all purposes.

Fuel processor 400 may, but does not necessarily, further include a polishing region 448, such as shown in FIG. 17. Polishing region 448 receives hydrogen-rich stream 34 from device 10 and further purifies the stream by reducing the concentration of, or removing, selected compositions therein. In FIG. 17, the resulting stream is indicated at 414 and may be referred to as a product hydrogen stream or purified hydrogen stream. When fuel processor 400 does not include polishing region 448, hydrogen-rich stream 34 forms product hydrogen stream 414. For example, when stream 34 is intended for use in a fuel cell stack, compositions that may damage the fuel cell stack, such as carbon monoxide and carbon dioxide, may be removed from the hydrogen-rich stream, if necessary. The concentration of carbon monoxide should be less than 10 ppm (parts per million) to prevent the control system from isolating the fuel cell stack. Preferably, the system limits the concentration of carbon monoxide to less than 5 ppm, and even more preferably, to less than 1 ppm. The concentration of carbon dioxide may be greater than that of carbon monoxide. For example, concentrations of less than 25% carbon dioxide may be acceptable. Preferably, the concentration is less than 10%, and even more preferably, less than 1%. Especially preferred concentrations are less than 50 ppm. It should be understood that the acceptable minimum concentrations presented herein are illustrative examples, and that concentrations other than those presented herein may be used and are within the scope of the present disclosure. For example, particular users or manufacturers may require minimum or maximum concentration levels or ranges that are different than those identified herein.

Region 448 includes any suitable structure for removing or reducing the concentration of the selected compositions in stream 34. For example, when the product stream is intended for use in a proton exchange membrane (PEM) fuel cell stack or other device that will be damaged if the stream contains more than determined concentrations of carbon monoxide or carbon dioxide, it may be desirable to include at least one methanation catalyst bed 450. Bed 450 converts carbon monoxide and carbon dioxide into methane and water, both of which will not damage a PEM fuel cell stack. Polishing region 448 may also include another hydrogen-producing region 452, such as another reforming catalyst bed, to convert any unreacted feedstock into hydrogen gas. In such an embodiment, it is preferable that the second reforming catalyst bed is upstream from the methanation catalyst bed so as not to reintroduce carbon dioxide or carbon monoxide downstream of the methanation catalyst bed.

Steam reformers typically operate at temperatures in the range of 200° C. and 700° C., and at pressures in the range of 50 psi and 1000 psi, although temperatures outside of this range are within the scope of the disclosure, such as depending upon the particular type and configuration of fuel processor being used. Any suitable heating mechanism or device may be used to provide this heat, such as a heater, burner, combustion catalyst, or the like. The heating assembly may be external the fuel processor or may form a combustion chamber that forms part of the fuel processor. The fuel for the heating assembly may be provided by the fuel processing or fuel cell system, by an external source, or both.

In FIG. 17, fuel processor 400 is shown including a shell 412 in which the above-described components are contained. Shell 412, which also may be referred to as a housing, enables the components of the fuel processor to be moved as a unit. It also protects the components of the fuel processor from damage by providing a protective enclosure and reduces the heating demand of the fuel processor because the components of the fuel processor may be heated as a unit. Shell 412 may, but does not necessarily, include insulating material 433, such as a solid insulating material, blanket insulating material, or an air-filled cavity. It is within the scope of the disclosure, however, that the fuel processor may be formed without a housing or shell. When fuel processor 400 includes insulating material 433, the insulating material may be internal the shell, external the shell, or both. When the insulating material is external a shell containing the above-described reforming, separation and/or polishing regions, the fuel processor may further include an outer cover or jacket external the insulation.

It is further within the scope of the disclosure that one or more of the components of fuel processor 400 may either extend beyond the shell or be located external at least shell 412. For example, device 10 may extend at least partially beyond shell 412, as indicated in FIG. 16. As another example, and as schematically illustrated in FIG. 17, polishing region 448 may be external shell 412 and/or a portion of hydrogen-producing region 432 (such as portions of one or more reforming catalyst beds) may extend beyond the shell.

As indicated above, fuel processor 400 may be adapted to deliver hydrogen-rich stream 34 or product hydrogen stream 414 to at least one fuel cell stack, which produces an electric current therefrom. In such a configuration, the fuel processor and fuel cell stack may be referred to as a fuel cell system. An example of such a system is schematically illustrated in FIG. 18, in which a fuel cell stack is generally indicated at 422. The fuel cell stack is adapted to produce an electric current from the portion of product hydrogen stream 414 delivered thereto. In the illustrated embodiment, a single fuel processor 400 and a single fuel cell stack 422 are shown and described, however, it should be understood that more than one of either or both of these components may be used. It should also be understood that these components have been schematically illustrated and that the fuel cell system may include additional components that are not specifically illustrated in the Figures, such as feed pumps, air delivery systems, heat exchangers, heating assemblies and the like.

Fuel cell stack 422 contains at least one, and typically multiple, fuel cells 424 that are adapted to produce an electric current from the portion of the product hydrogen stream 414 delivered thereto. This electric current may be used to satisfy the energy demands, or applied load, of at least one associated energy-consuming device 425. Illustrative examples of devices 425 include, but should not be limited to, a motor vehicle, recreational vehicle, boat, tools, lights or lighting assemblies, appliances (such as a household or other appliance), household, office, business, signaling or communication equipment, etc. It should be understood that device 425 is schematically illustrated in FIG. 18 and is meant to represent one or more devices or collection of devices that are adapted to draw electric current from the fuel cell system. A fuel cell stack typically includes multiple fuel cells joined together between common end plates 423, which contain fluid delivery/removal conduits (not shown). Examples of suitable fuel cells include PEM fuel cells and alkaline fuel cells. Fuel cell stack 422 may receive all of product hydrogen stream 414. Some or all of stream 414 may additionally, or alternatively, be delivered, via a suitable conduit, for use in another hydrogen-consuming process, burned for fuel or heat, or stored for later use.

INDUSTRIAL APPLICABILITY

The hydrogen purification devices, components and fuel processing and fuel cell systems disclosed herein are applicable to the fuel processing, fuel cell, and other industries in which hydrogen gas is produced and/or utilized.

It is believed that the disclosure set forth above encompasses multiple distinct inventions with independent utility. While each of these inventions has been disclosed in its preferred form, the specific embodiments thereof as disclosed and illustrated herein are not to be considered in a limiting sense as numerous variations are possible. The subject matter of the inventions includes all novel and non-obvious combinations and subcombinations of the various elements, features, functions and/or properties disclosed herein. Similarly, where the claims recite "a" or "a first" element or the equivalent thereof, such claims should be understood to include incorporation of one or more such elements, neither requiring nor excluding two or more such elements.

It is believed that the following claims particularly point out certain combinations and subcombinations that are directed to one of the disclosed inventions and are novel and non-obvious. Inventions embodied in other combinations and subcombinations of features, functions, elements and/or properties may be claimed through amendment of the present claims or presentation of new claims in this or a related application. Such amended or new claims, whether they are directed to a different invention or directed to the same invention, whether different, broader, narrower or equal in scope to the original claims, are also regarded as included within the subject matter of the inventions of the present disclosure.

We claim:

1. A hydrogen purification device, comprising:
   a sealed enclosure defining a pressure vessel with an internal compartment, wherein the device is configured to receive into the compartment a mixed gas stream comprising hydrogen gas and other gases, and to produce therefrom a hydrogen-rich permeate stream containing at least substantially pure hydrogen gas and a byproduct stream containing at least a substantial portion of the other gases; and a hydrogen-selective membrane permanently and directly secured to the enclosure to form a seal therewith and extending within the compartment to divide the compartment into a mixed gas region and a permeate region, wherein the membrane includes a mixed gas surface configured to be contacted by the mixed gas stream and a permeate surface generally opposed to the mixed gas surface, wherein the membrane is configured to selectively allow a first portion of the mixed gas stream to pass through the membrane from the mixed gas region to the permeate region and to selectively prohibit a second portion of the mixed gas stream from passing through the membrane from the mixed gas region to the permeate region, and wherein the permeate stream is formed from the first portion of the mixed gas stream, and the byproduct stream is formed from the second portion of the mixed gas stream.

2. The device of claim 1, further comprising an interface formed from consumed portions of the hydrogen-selective membrane and the enclosure.

3. The device of claim 2, wherein the consumed portion of the hydrogen-selective membrane forms an alloy with the consumed portion of the enclosure.

4. The device of claim 3, wherein the hydrogen-selective membrane is welded to the enclosure to form a seal between the membrane and the enclosure.

5. The device of claim 1, wherein a portion of the hydrogen-selective membrane is brazed to the enclosure to form a seal between the membrane and the enclosure.

6. The device of claim 2, wherein the hydrogen-selective membrane is diffusion-bonded to the enclosure to form a seal between the membrane and the enclosure.

7. The device of claim 1, wherein the device includes a membrane support within the permeate region of the enclosure and is configured to support the permeate surface of the hydrogen-selective membrane.

8. The device of claim 7, wherein the enclosure includes a first chamber within the permeate region and is configured to receive the membrane support.

9. The device of claim 7, wherein the membrane support is adapted to permit the first portion of the mixed gas stream that passes through the hydrogen-selective membrane to flow through the support.

10. The device of claim 7, wherein the enclosure and the membrane support define a transition therebetween, and further wherein the device includes at least one pad configured to span the transition and to prevent the permeate surface of the hydrogen-selective membrane from engaging the transition.

11. The device of claim 10, wherein the at least one pad does not create a gas-impermeable seal between the hydrogen-selective membrane and the enclosure.

12. The device of claim 10, wherein the at least one pad includes a gasket under less than 30% compression.

13. The device of claim 10, wherein the at least one pad includes a tapered internal perimeter region adapted to minimize wrinkling of the membrane when the device is used.

14. The device of claim 1, wherein the enclosure includes a pair of end plates to which the hydrogen-selective membrane is welded.

15. The device of claim 1, wherein the enclosure includes a pair of end plates that each include an outer perimeter, an inner perimeter, and a sealing region extending between the inner and the outer perimeters, and further wherein the hydrogen-selective membrane extends from the internal compartment at least partially across the sealing regions of the end plates.

16. The device of claim 15, wherein the hydrogen-selective membrane includes an outer perimeter region that extends at least to the outer perimeter of the end plates.

17. The device of claim 1, wherein the hydrogen-selective membrane includes an outer perimeter region and the device includes a continuous seal between the outer perimeter region and the enclosure.

18. The device of claim 1, wherein the hydrogen-selective membrane is a generally planar membrane having a cross-sectional area that is greater than the cross-sectional area bounded by an inner perimeter of the enclosure across which the membrane extends.

19. The device of claim 1, wherein the enclosure has an inner perimeter that defines the compartment and further wherein the hydrogen-selective membrane includes an outer perimeter region that extends external of the inner perimeter of the enclosure.

20. The device of claim 19, wherein the outer perimeter region of the hydrogen-selective membrane extends external the enclosure.

21. The device of claim 1, wherein the enclosure includes a pair of end plates and a perimeter shell to which the hydrogen-selective membrane is permanently and directly secured to form a gas-tight seal between the membrane and the perimeter shell, and further wherein the perimeter shell is permanently and directly secured to the pair of end plates.

22. The device of claim 21, wherein the perimeter shell is separately formed from the pair of end plates.

23. The device of claim 21, wherein the device includes an interface formed from consumed portions of the hydrogen-selective membrane and the perimeter shell.

24. The device of claim 23, wherein the consumed portion of the hydrogen-selective membrane forms an alloy with the consumed portion of the perimeter shell.

25. The device of claim 24, wherein the hydrogen-selective membrane is at least one of welded to the perimeter shell and diffusion bonded to the perimeter shell.

26. The device of claim 21, wherein a portion of the hydrogen-selective membrane is brazed to the perimeter shell to form the seal therewith.

27. The device of claim 21, wherein the device includes a membrane support adapted to support the permeate surface of the hydrogen-selective membrane.

28. The device of claim 27, wherein the membrane support includes an outer perimeter and the perimeter shell overlaps with the membrane support to prevent the permeate surface of the membrane from contacting the outer perimeter of the membrane support.

29. A hydrogen purification device, comprising:
a sealed enclosure defining a pressure vessel with an internal compartment, wherein the sealed enclosure is free from gaskets, and wherein the device is configured to receive into the compartment a mixed gas stream comprising hydrogen gas and other gases, and to produce therefrom a hydrogen-rich permeate stream containing at least substantially pure hydrogen gas and a byproduct stream containing at least a substantial portion of the other gases; and
a hydrogen-selective membrane disposed at least substantially within the compartment, wherein the hydrogen-selective membrane is permanently and directly secured to the enclosure to form a gas-tight seal with the enclosure and to divide the internal compartment into a mixed gas region and a permeate region, wherein the gas-tight seal is formed without compressible gaskets, wherein the hydrogen-selective membrane includes a mixed gas surface configured to be contacted by the mixed gas stream and a permeate surface generally opposed to the mixed gas surface, wherein the permeate stream is formed from a portion of the mixed gas stream that passes through the hydrogen-selective membrane to the permeate surface, and the byproduct stream is formed from a portion of the mixed gas stream that does not pass through the hydrogen-selective membrane.

30. The device of claim 29, wherein a portion of the hydrogen-selective membrane forms a portion of the seal.

31. The device of claim 30, wherein the hydrogen-selective membrane includes an outer perimeter region and the outer perimeter region forms a portion of the seal.

32. The device of claim 30, wherein the seal is formed entirely from metal.

33. The device of claim 30, wherein the portion of the hydrogen-selective membrane is a consumed portion of the membrane.

34. The device of claim 33, wherein the consumed portion of the hydrogen-selective membrane forms an alloy with a consumed portion of the enclosure.

35. The device of claim 34, wherein the hydrogen-selective membrane is welded to the enclosure to form a portion of the seal.

36. The device of claim 33, wherein the hydrogen-selective membrane is diffusion-bonded to the enclosure to form a portion of the seal.

37. The device of claim 30, wherein the portion of the hydrogen-selective membrane is brazed to the enclosure to form a portion of the seal.

38. The device of claim 30, wherein the enclosure is formed from at least two components that include sealing regions, wherein the at least two components are secured together at the sealing regions to form the seal with the hydrogen-selective membrane.

39. The device of claim 38, wherein the hydrogen-selective membrane includes an outer perimeter region that spans across at least a portion of the sealing regions.

40. The device of claim 39, wherein the outer perimeter region of the hydrogen-selective membrane extends external the enclosure.

41. The device of claim 29, wherein the enclosure includes a membrane support configured to support the permeate surface of the hydrogen-selective membrane.

42. The device of claim 41, wherein the membrane support is adapted to permit the portion of the mixed gas stream that permeates through the hydrogen-selective membrane to flow through the support.

43. The device of claim 41, wherein the enclosure and the membrane support define a transition therebetween, and further wherein the device includes at least one pad configured to span the transition and to prevent the permeate surface of the hydrogen-selective membrane from engaging the transition.

44. The device of claim 43, wherein the at least one pad does not create a gas-impermeable seal between the hydrogen-selective membrane and the enclosure.

45. The device of claim 44, wherein the at least one pad includes a gasket under less than 30% compression.

46. The device of claim 43, wherein the at least one pad includes a tapered internal perimeter adapted to minimize wrinkling of the membrane when the device is used.

47. The device of claim 29, wherein the enclosure includes a pair of end plates, and the device includes a seal between the pair of end plates and the hydrogen-selective membrane.

48. The device of claim 47, wherein at least a portion of the membrane and the enclosure is consumed to form the seal.

49. The device of claim 29, wherein the enclosure includes a frame to which the hydrogen-selective membrane is permanently and directly secured to from a gas-tight seal therebetween without the use of compressible gaskets.

50. The device of claim 49, wherein the enclosure further includes a pair of end plates to which the frame is secured.

51. A hydrogen purification device, comprising:
a sealed enclosure having a pair of end plates defining a pressure vessel with an internal compartment, wherein the device is configured to receive into the compartment a mixed gas stream comprising hydrogen gas and other gases, and to produce therefrom a hydrogen-rich permeate stream containing at least substantially pure hydrogen gas and a byproduct stream containing at least a substantial portion of the other gases;
a hydrogen-selective membrane supported within the compartment, wherein the hydrogen-selective membrane includes a mixed gas surface configured to be contacted by the mixed gas stream and a permeate surface generally opposed to the mixed gas surface, wherein the permeate stream is formed from a portion of the mixed gas stream that passes through the hydrogen-selective membrane to the permeate surface, and the byproduct stream is formed from a portion of the mixed gas stream that does not pass through the hydrogen-selective membrane; and
wherein the enclosure includes an interface formed from portions of the membrane and the pair of end plates that are permanently and directly secured together to form a seal.

52. The device of claim 51, wherein each of the pair of end plates includes an inner perimeter, an outer perimeter, and a sealing region that extends between the inner perimeter and the outer perimeter, and further wherein at least a portion of the membrane extends from within the compartment beyond the inner perimeters of the pair of end plates and between the sealing regions of the pair of end plates.

53. The device of claim 52, wherein at least a portion of the membrane extends external the enclosure.

54. The device of claim 51, wherein the membrane is secured to the end plates through at least one of welding and diffusion bonding.

55. The device of claim 51, wherein the device further includes a membrane support configured to support the permeate surface of the hydrogen-selective membrane.

56. The device of claim 55, wherein the membrane support includes an outer perimeter, and further wherein the device includes at least one pad configured to overlap with the outer perimeter of the membrane support to prevent the permeate surface of the hydrogen-selective membrane from engaging the outer perimeter of the membrane support.

57. The device of claim 56, wherein the at least one pad includes at least one of a gasket that does not form a gas-impermeable seal between the membrane and the second end plate, a gasket under less than 30% compression, and gas-permeable material.

* * * * *

UNITED STATES PATENT AND TRADEMARK OFFICE
CERTIFICATE OF CORRECTION

PATENT NO. : 7,297,183 B2  Page 1 of 1
APPLICATION NO. : 10/945783
DATED : November 20, 2007
INVENTOR(S) : David J. Edlund, Chester B. Frost and R. Todd Studebaker It is certified that error appears in the above-identified patent and that said Letters Patent is hereby corrected as shown below:

Column 24,
Line 10, after "is permanently and directly secured to" please delete "from" and insert --form-- therefor.

Signed and Sealed this

Fifteenth Day of April, 2008

JON W. DUDAS
*Director of the United States Patent and Trademark Office*